United States Patent
Yang

(10) Patent No.: US 11,080,500 B2
(45) Date of Patent: Aug. 3, 2021

(54) TWO-DIMENSIONAL CODE ERROR CORRECTION DECODING

(71) Applicant: BEIJING SANKUAI ONLINE TECHNOLOGY CO., LTD, Beijing (CN)

(72) Inventor: Chongling Yang, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/810,378

(22) Filed: Mar. 5, 2020

(65) Prior Publication Data

US 2020/0202096 A1 Jun. 25, 2020

Related U.S. Application Data

(63) Continuation-in-part of application No. PCT/CN2017/119723, filed on Dec. 29, 2017.

(30) Foreign Application Priority Data

Sep. 21, 2017 (CN) .......................... 201710857442.1

(51) Int. Cl.
*G06K 7/14* (2006.01)

(52) U.S. Cl.
CPC ......... *G06K 7/1473* (2013.01); *G06K 7/1417* (2013.01)

(58) Field of Classification Search
CPC .......................... G06K 7/1473; G06K 7/1417
See application file for complete search history.

(56) References Cited

U.S. PATENT DOCUMENTS

| 6,126,074 A * | 10/2000 | He .......................... G06K 7/14 235/454 |
| 7,870,469 B1 | 1/2011 | Wu |
| 2016/0267312 A1* | 9/2016 | Vasic ................... G06K 7/1456 |

(Continued)

FOREIGN PATENT DOCUMENTS

| CN | 103530590 A | 1/2014 |
| CN | 103944584 A | 7/2014 |

(Continued)

OTHER PUBLICATIONS

Dec. 28, 2000, The State Bureau of Quality and Technical Supervision of China, "QR Code", GB/T 18284-2000.

(Continued)

*Primary Examiner* — Matthew Mikels
(74) *Attorney, Agent, or Firm* — Kolitch Romano LLP

(57) ABSTRACT

A two-dimensional code error correction decoding method is provided. In an embodiment, a two-dimensional code image is preprocessed to obtain a data codeword for decoding; optimal parameter matching is performed based on the data codeword to obtain a corresponding interpolation severity, and interpolation is performed based on the interpolation severity to construct a binary polynomial; an optimal information polynomial is obtained based on the binary polynomial, and the optimal information polynomial is used as an information codeword; and data decoding is performed based on the information codeword to obtain original information corresponding to the two-dimensional code image.

17 Claims, 6 Drawing Sheets

(56) References Cited

U.S. PATENT DOCUMENTS

2016/0301429 A1* 10/2016 Shany ............... H03M 13/1525

FOREIGN PATENT DOCUMENTS

CN 104915699 A 9/2015
CN 105811999 A 7/2016

OTHER PUBLICATIONS

Jun. 21, 2018, International Search Report and Written Opinion from the State Intellectual Property Office of China in PCT Application No. PCT/CN2017/119723, which is the international application to this U.S. application.

Nov. 5, 2019, First Office Action from the State Intellectual Property Office of China in Chinese Application No. 201710857442.1, to which this application claims priority.

* cited by examiner

| QR code version number | RS code | Current decoding algorithm | Self-defined decoding system | Error correction capability improvement |
|---|---|---|---|---|
| 1-L | (26,19) | 7% | 15% | 8% |
| 1-M | (26,16) | 15% | 23% | 8% |
| 1-Q | (26,13) | 25% | 30% | 5% |
| 1-H | (26,9) | 30% | 42% | 12% |
| 2-H | (44,16) | 30% | 38% | 8% |
| 3-H | (35,13) | 30% | 40% | 10% |
| 6-H | (43,15) | 30% | 44% | 14% |

US 11,080,500 B2

TWO-DIMENSIONAL CODE ERROR CORRECTION DECODING

CROSS-REFERENCE TO RELATED APPLICATIONS

This patent application is a continuation in part (CIP) of International Patent Application No. PCT/CN2017/119723 filed on Dec. 29, 2017 and entitled "TWO-DIMENSIONAL CODE ERROR CORRECTION DECODING", which is incorporated herein by reference in its entirety. This international application claims priority to Chinese Patent Application No. 201710857442.1 filed on Sep. 21, 2017 and entitled "TWO-DIMENSIONAL CODE ERROR CORRECTION DECODING METHOD AND APPARATUS, ELECTRONIC DEVICE, AND COMPUTER-READABLE MEDIUM", which is incorporated herein by reference in its entirety.

TECHNICAL FIELD

This disclosure relates to two-dimensional code error correction decoding.

BACKGROUND

A two-dimensional code is of high information density and confidentiality, and can represent different information. Therefore, the two-dimensional code is widely applied in fields such as security, media promotion, anti-counterfeiting, equipment management, ticketing, clinical medicine, and electronic payment. Accordingly, the two-dimensional code becomes a premise of big data analysis, an entry-level application of the mobile Internet, and a key to effective operation of an online to offline (O2O) business model.

SUMMARY

In view of this, this application discloses a two-dimensional code error correction decoding method, including:
preprocessing a two-dimensional code image to obtain a data codeword for decoding;
performing optimal parameter matching, based on the data codeword, to obtain a corresponding interpolation severity;
performing interpolation, based on the interpolation severity, to construct a binary polynomial;
obtaining an information codeword based on the binary polynomial; and
performing data decoding, based on the information codeword, to obtain original information corresponding to the two-dimensional code image.

This application further discloses an electronic device, including:
a processor and a machine-readable storage medium, where
the machine-readable storage medium stores a machine-executable instruction that can be executed by the processor, and the machine-executable instruction enables the processor to:
preprocess a two-dimensional code image to obtain a data codeword for decoding;
perform optimal parameter matching, based on the data codeword, to obtain a corresponding interpolation severity;
perform interpolation, based on the interpolation severity, to construct a binary polynomial;
obtain an information codeword based on the binary polynomial; and
perform data decoding, based on the information codeword, to obtain original information corresponding to the two-dimensional code image.

This application further discloses a computer-readable medium, storing a computer-executable instruction. When invoked and executed by a processor of an electronic device, the computer-executable instruction enables the processor to:
preprocess a two-dimensional code image to obtain a data codeword for decoding;
perform optimal parameter matching, based on the data codeword, to obtain a corresponding interpolation severity;
perform interpolation, based on the interpolation severity, to construct a binary polynomial;
obtain an information codeword based on the binary polynomial; and
perform data decoding, based on the information codeword, to obtain original information corresponding to the two-dimensional code image.

DETAILED DESCRIPTION

The following clearly and completely describes the technical solutions in the embodiments of this application with reference to the accompanying drawings in the embodiments of this application. Apparently, the described embodiments are merely some but not all of the embodiments of this application. All other embodiments obtained by persons of ordinary skill in the art based on the embodiments of this application without creative efforts shall fall within the protection scope of this application.

According to differences between coding principles and structural shapes of two-dimensional codes, the two-dimensional codes may be classified into a row-type two-dimensional code and a matrix-type two-dimensional code. The matrix-type two-dimensional code has a higher information density than the row-type two-dimensional code. In the matrix-type two-dimensional code, a Reed-Solomon (RS) code may be used, and a related decoding algorithm may be an RS code accompanied decoding algorithm (a BM algorithm). The BM algorithm is a limited-distance decoding algorithm, and has a poor error correction decoding capability. As a result, an identification capability of a two-dimensional code decoding technology is limited, and it is difficult to restore original input information of a two-dimensional code in a poor condition such as deinking or staining. Moreover, the BM algorithm has poor decoding performance and a poor anti-noise capability. Especially when a two-dimensional code is partially peeled, stained, pierced, or torn, an identification speed of the two-dimensional code decoding technology is slow.

In some cases, it is difficult to print information represented by the two-dimensional code together with a barcode symbol, and the two-dimensional code is easily stained and destroyed as long exposed on the surface of a printed matter. When a two-dimensional code picture is used under some harsh conditions, the picture is highly likely to be stained. In the embodiments of this application, an error correction technology may be introduced to the two-dimensional code. For the two-dimensional code carrying an error correction code, original information can still be correctly restored by using a specific error correction decoding algorithm when the two-dimensional code appears to be partially peeled, stained, pierced, or torn, so that a decoding system has a stronger error correction capability.

Figure 1:
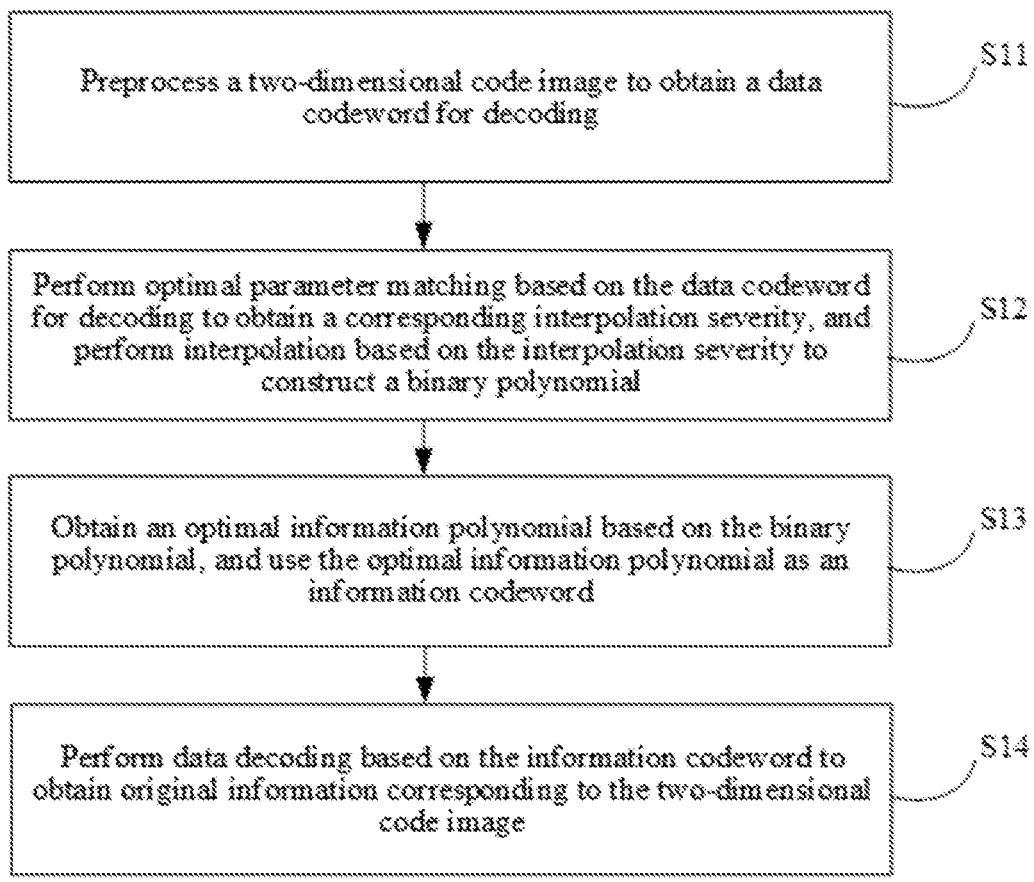
FIG. 1 is a flowchart of a two-dimensional code error correction decoding method according to an embodiment of this disclosure.

FIG. 1 is a flowchart of a two-dimensional code error correction decoding method according to an embodiment of this disclosure. As shown in FIG. 1, the method includes the following steps:

Step S11: Preprocess a two-dimensional code image to obtain a data codeword for decoding.

Step S12: Perform optimal parameter matching, based on the data codeword for decoding, to obtain a corresponding interpolation severity, and perform interpolation, based on the interpolation severity, to construct a binary polynomial.

Step S13: Obtain an optimal information polynomial based on the binary polynomial, and use the optimal information polynomial as an information codeword.

Step S14: Perform data decoding, based on the information codeword, to obtain original information corresponding to the two-dimensional code image.

Based on the method in this embodiment of this application, a self-defined decoding algorithm procedure is performed for two-dimensional code error correction decoding, which has a strong error correction capability, and can quickly restore original information.

In step S13, the binary polynomial may be factorized to obtain a unary polynomial set, and the unary polynomial set is screened to obtain the optimal information polynomial.

Figure 2:
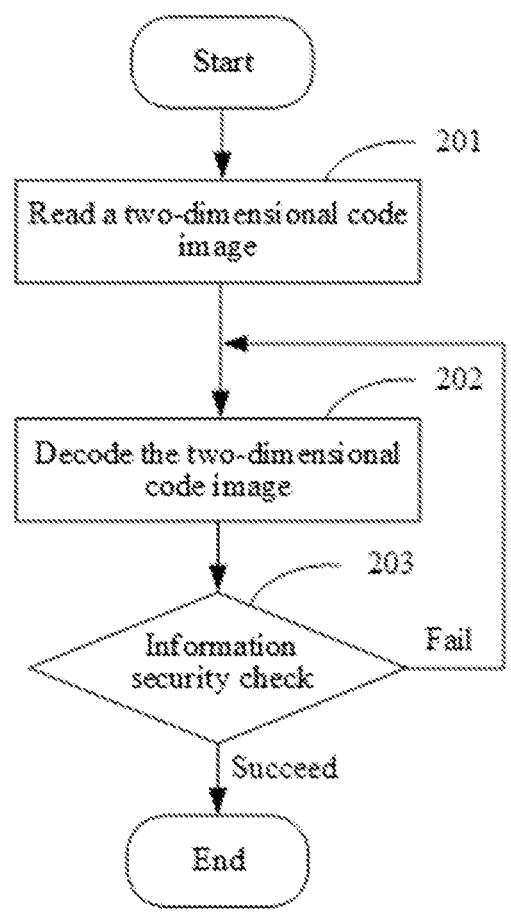
FIG. 2 is a flowchart of preprocessing a two-dimensional code image according to an embodiment of this disclosure.

FIG. 2 is a flowchart of preprocessing a two-dimensional code image according to an embodiment. As shown in FIG. 2, the preprocessing includes the following steps:

Step 201: Read the two-dimensional code image by a two-dimensional code identification means (for example, "scan") in any APP of a client.

Step 202: Decode the two-dimensional code image.

In an embodiment, the decoding the two-dimensional code image may include: identifying a dark module and a light module in the two-dimensional code image; performing format information decoding on the two-dimensional code image; determining a version of the two-dimensional code image; eliminating a mask of the two-dimensional code image; and restoring a data codeword and an error correction codeword of the two-dimensional code image.

The two-dimensional code image includes a dark module and a light module, for example, a black module and a white module, and certainly may also include modules in other colors. In addition, a codeword refers to a unit of data in the two-dimensional code image. For a QR code, every eight bits represent one codeword. The two-dimensional code image includes a data codeword. The data codeword includes an information codeword and an error correction codeword. The information codeword refers to a codeword obtained by encoding original information included in the two-dimensional code image. The error correction codeword may be obtained through calculation on the information codeword, and is used to correct an error caused when the two-dimensional code image is damaged. Moreover, the two-dimensional code image further includes a mask. The mask is used to balance proportions of the dark module and the light module in the two-dimensional code image.

By identifying the dark module and the light module in the two-dimensional code image, locations of the dark module and the light module in the two-dimensional code image can be determined, that is, format information of the two-dimensional code image is determined. The two-dimensional code image is decoded based on the determined format information. Moreover, for decoding, it is necessary to determine the version of the two-dimensional code image, and eliminate the mask of the two-dimensional code image, to finally restore the data codeword and the error correction codeword of the two-dimensional code image.

Step 203: Perform information security check based on the restored data codeword.

In this embodiment, the information security check specifically includes the following process:

determining whether the restored data codeword conforms to format information and version information, and if the restored data codeword conforms to the format information and the version information (the information security check succeeds), obtaining the data codeword for decoding, or if the restored data codeword does not conform to the format information and the version information (the information security check fails), further preprocessing the two-dimensional code image (repeating the step of reading the two-dimensional code image, identifying a dark module and a light module, performing format information decoding, determining a version, eliminating a mask, and restoring a data codeword and an error correction codeword) until the restored data codeword conforms to the format information and the version information. In this embodiment of this application, information security check is performed on the restored data codeword, which can improve security.

Figure 3:
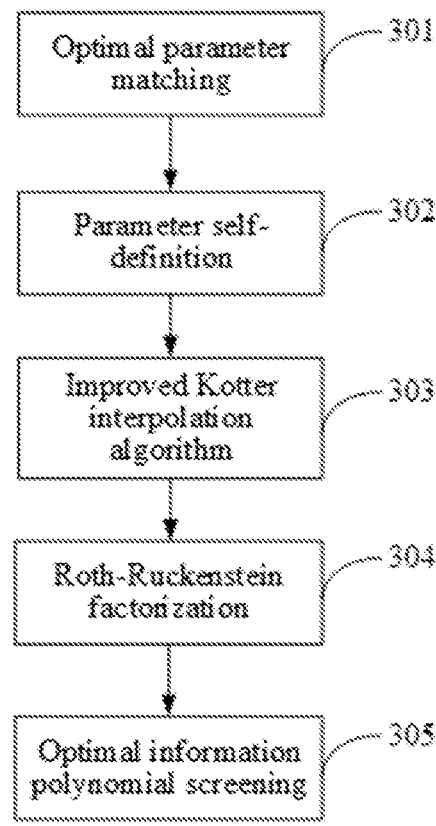
FIG. 3 is a flowchart of obtaining an information codeword based on a data codeword according to an embodiment of this disclosure.

FIG. 3 is a flowchart of a method of obtaining an information codeword based on a data codeword according to an embodiment of this disclosure. As shown in FIG. 3, the method includes the following steps:

Step 301: Perform optimal parameter matching, based on the data codeword, to obtain an interpolation severity.

In this embodiment, the performing optimal parameter matching based on the data codeword includes: setting an initial variable based on an information codeword weight and an error correction codeword weight in the data codeword, and updating the initial variable through fitting and iteration.

For example, an initial variable a0 is set to an initial iteration value, and then iterated by using an iteration method. If the given initial variable is close to an optimal solution, the optimal solution is highly likely to be obtained through iteration. The initial variable may be further adjusted based on an iteration result. The optimal solution is related to a unique optimal information polynomial obtained in interpolation, factorization, and other steps below.

In this embodiment, the performing optimal parameter matching based on the data codeword may include determining the interpolation severity based on an information codeword weight and an error correction codeword weight in the data codeword. If no unique optimal information polynomial is obtained in subsequent factorization, the interpolation severity may be updated through fitting and iteration.

For example, an interpolation severity $a_0$ is set to an initial iteration value, and iterated by using an iteration method. If the given interpolation severity is close to an optimal solution, the optimal solution is highly likely to be obtained through iteration. The interpolation severity may be further adjusted based on an iteration result. The optimal solution is related to a unique optimal information polynomial obtained in interpolation, factorization, and other steps below.

In an embodiment, the interpolation severity may be determined based on the information codeword weight in the data codeword, the interpolation severity may be determined based on the error correction codeword weight in the data codeword, or the interpolation severity may be determined based on the information codeword weight and the error correction codeword weight in the data codeword.

For example, the interpolation severity is determined based on the information codeword weight in the data codeword. A relationship between the information codeword weight in the data codeword and the interpolation severity may be preset. For example, when the information codeword weight is within (0, 30%], a corresponding interpolation severity is 1; when the information codeword weight is within (30%, 50%], a corresponding interpolation severity is 2; when the information codeword weight is within (50%, 70%], a corresponding interpolation severity is 3. It is assumed that the information codeword weight in the data codeword is 40%. Based on the information codeword weight 40%, it is determined that the interpolation severity is 1.

Step 302: Self-define a parameter.

In this embodiment, an initial interpolation point may be self-defined, which is, for example, (1, α). If no unique optimal information polynomial is obtained in subsequent factorization, the interpolation severity is increased by 1 and the interpolation step is repeated, until a unique optimal information polynomial is obtained.

Step 303: Construct a binary polynomial Q(x,y) by using an improved Kotter interpolation algorithm. In this embodiment, if the interpolation severity obtained through optimal parameter matching is m, the performing interpolation based on the selected interpolation severity includes: self-defining an initial interpolation point, and performing interpolation at least m times at each interpolation point based on a weighted dictionary reverse order table by using the improved Kotter interpolation algorithm in combination with the interpolation severity, to construct the binary polynomial Q(x,y).

In an embodiment, the improved Kotter interpolation algorithm may include the following steps:

Step 1). Initialize a binary polynomial to obtain a binary polynomial set.

In an embodiment, the number of iteration times is initially 0.

Step 2). Eliminate a binary polynomial with a first order greater than C in the binary polynomial set.

Step 3). Calculate Hasse mixed partial derivatives of binary polynomials in the binary polynomial set, and determine whether the Hasse mixed partial derivatives of all the binary polynomials in the set are equal to 0. If the Hasse mixed partial derivatives of all the binary polynomials in the set are equal to 0, perform step 6). If the Hasse mixed partial derivatives of the binary polynomials in the set are not all equal to 0, perform step 4).

Step 4). Obtain a minimum polynomial in the binary polynomials in the set.

Step 5). Transform and modify the minimum polynomial and other binary polynomials in the set by using different formulas respectively.

Step 6). Increase the number of iteration times by 1 to obtain another binary polynomial, and repeat step 1) to step 5) to obtain a minimum polynomial in the binary polynomial.

Step 7). When the number of iteration times is equal to C, stop iteration. In this case, minimum polynomials in binary polynomials form a set, a minimum polynomial in C binary polynomials is solved to obtain the interpolation polynomial Q(x,y).

It should be noted that interpolation and fitting are important components of function approximation or numerical approximation. Fitting means that several discrete function values $\{f_1, f_2, \ldots, f_n\}$ of a function are known, and a difference (in a least square sense) between the function and a known point set is minimized by adjusting several undetermined coefficients $f(\lambda_1, \lambda_2, \ldots, \lambda_3)$ in the function. Interpolation means that function values or derivative information of a function at several discrete points are known, and the function is enabled to meet a constraint at a given discrete point by solving an interpolation function in an undetermined form and an undetermined coefficient in the function. Fitting is to find, based on some given points in space, a continuous surface of an unknown parameter in a known form to maximally approximate these points; interpolation is to find a continuous surface (or several smooth slices) including these points.

Step 304: After obtaining the interpolation polynomial Q(x,y), factorize the binary polynomial Q(x,y) by using a Roth-Ruckenstein algorithm.

In an embodiment, a plurality of factors like y−p(x) are obtained after factorization. p(x) is a unary polynomial. A unary polynomial set L may be obtained through factorization.

Step 305: Perform optimal information polynomial screening on each candidate information polynomial in the set L to obtain an RS information codeword.

In an embodiment, each polynomial p(x) in the set L may become an information polynomial m(x), and optimal information polynomial screening may be performed on each candidate information polynomial in L. For example, each candidate information polynomial is recoded, each codeword sequence obtained after recoding is compared with an RS code data codeword R, and a candidate information polynomial corresponding to a codeword with a minimum Hamming distance may be selected as the RS code information codeword.

The unary polynomial set L may be L={p(x): (y−p(x))|Q(x,y) and deg p(x)<k}. deg p(x)<k indicates that the number of p(x) is less than k. All unary polynomials in the set L may be recoded through frequency domain coding, a codeword obtained after recoding is compared with the data codeword, a unary polynomial corresponding to a codeword with a minimum Hamming distance is selected as an optimal information polynomial, and the optimal information polynomial is used as the RS information codeword.

It should be further noted that, the optimal information polynomial in this embodiment is unique. If an optimal information polynomial obtained the first time is not unique, parameter self-definition is repeated. For example, the interpolation severity is increased by 1, and interpolation is performed based on the new interpolation severity. Then factorization and optimal information polynomial screening are repeated, to obtain a unique optimal information polynomial, to end the entire error correction decoding process.

Figure 4:
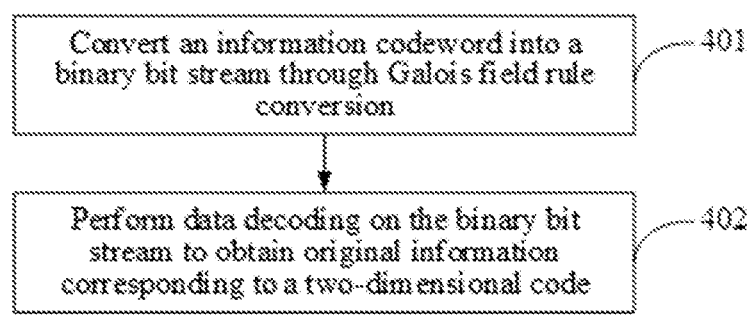
FIG. 4 is a flowchart of restoring original information of a two-dimensional code based on an information codeword according to an embodiment of this disclosure.

FIG. 4 is a flowchart of restoring original information of a two-dimensional code based on an information codeword according to an embodiment. As shown in FIG. 4, the method includes the following steps:

Step 401: Convert the information codeword into a binary bit stream through Galois field rule conversion.

Step 402: Perform data decoding on the binary bit stream to obtain the original information corresponding to the two-dimensional code.

To better describe the technical solutions of this disclosure, in the following description, data input by a two-dimensional code of a version 1-H is 01234567 for example.

The two-dimensional code of the version 1-H is preprocessed, and information security check is performed to obtain a data codeword RS (26, 9, 8) in a Galois field GF (2). It is assumed that the data codeword obtained after preprocessing is:

$R=(r^0, r_1, \ldots, r_{25})=(\alpha^{90}, \alpha^{220}, \alpha^{218}, \alpha^{230}, \alpha^{51}, \alpha^{95}, \alpha^{197}, \alpha^{252}, \alpha^{205}, \alpha^{38}, \alpha^{67}, \alpha^{196}, \alpha, \alpha^{32}, \alpha^{199}, \alpha^{122}, \alpha^{100}, \alpha^{122}, \alpha^7, \alpha^{66}, \alpha^{219}, \alpha^{27}, \alpha^5, \alpha^4)$.

The information codeword obtained in steps S12 and S13 is:

$c=(c_0, c_1, \ldots, c_{25})=(\alpha^{122}, \alpha^{100}, \alpha^{122}, \alpha^7, \alpha^{66}, \alpha^{219}, \alpha^{27}, \alpha^5, \alpha^4)$.

Finally, Galois field rule conversion is performed in step S14 to obtain a binary bit stream 00010000 0010000 00001100 10100110 01100001 10000000 11101100 00010001 11101100.

Then data decoding is performed based on the binary bit stream, and restored original information is 01234567.

Figures 5, 6:
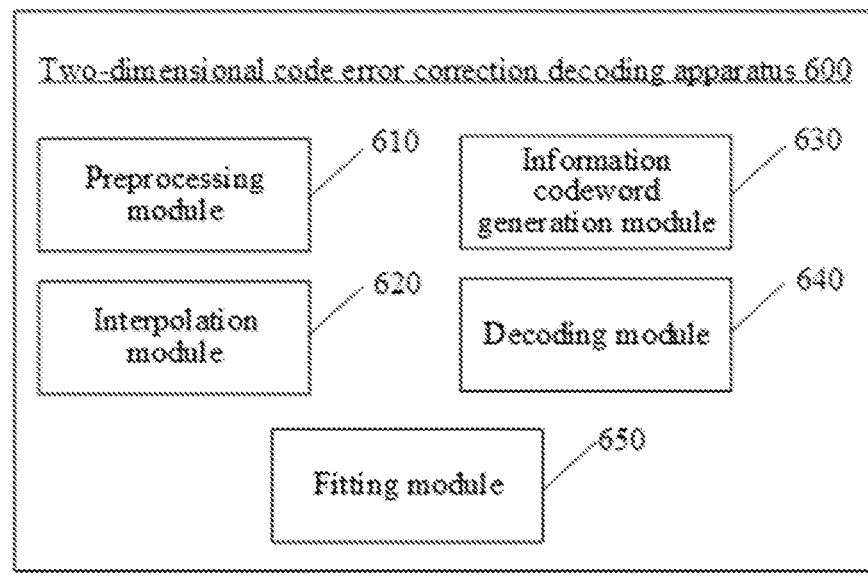
FIG. 5 is a diagram according to an embodiment of this disclosure of error correction capability comparison between a self-defined decoding error correction algorithm provided in this embodiment and a current decoding algorithm that are used for quick response codes (QR codes) of several versions.
FIG. 6 is a schematic structural diagram of a two-dimensional code error correction decoding apparatus according to another embodiment of this disclosure.

In the foregoing, a QR code of the version 1-H is used as an example, and an error correction capability can be improved by 12%. FIG. 5 is a diagram of error correction capability comparison between a self-defined decoding error correction algorithm provided in this embodiment and a current decoding algorithm that are used for QR codes of several versions. As shown in FIG. 5, using the QR code as an example, error correction levels of symbols of different versions are improved at least 4%, and H is corresponding to a level improved most, for example, for a symbol of a QR code version 6-H, improvement can reach 14% at most; if at least one error correction data codeword is added, improvement of each error correction level can double at most, for example, a symbol of a QR code version 1-L.

Based on the above, a self-defined decoding algorithm procedure is provided for two-dimensional code error correction decoding. The self-defined decoding algorithm has a strong error correction decoding capability, can accurately identify different information, has good algorithm performance, and can quickly restore original information when a two-dimensional code is partially peeled, stained, pierced, or torn. In addition, after the data codeword is obtained, information security check is performed first, which can improve security.

The foregoing describes the method provided in this application. The following describes an apparatus provided in this application.

Figure 10:
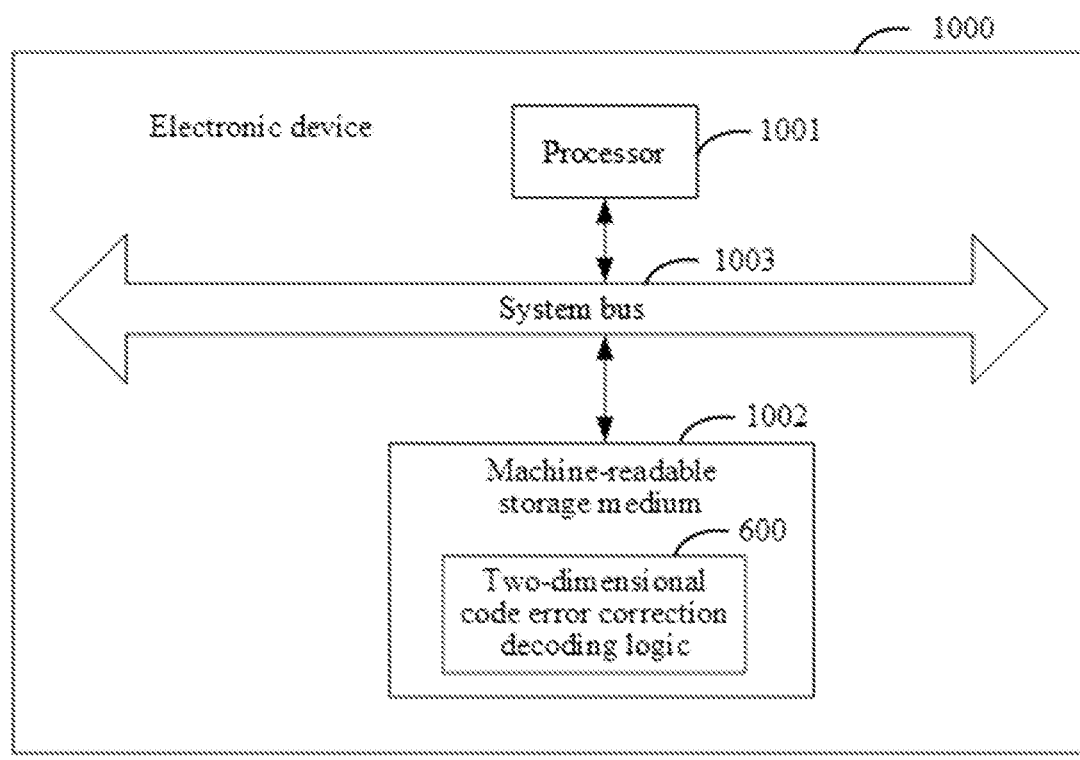
FIG. 10 is a schematic diagram of a hardware structure of an electronic device according to still another embodiment of this disclosure.

FIG. 10 is a diagram of a hardware structure of an electronic device 1000 according to some embodiments of this application. The electronic device 1000 may include a processor 1001 and a machine-readable storage medium 1002. The processor 1001 and the machine-readable storage medium 1002 may communicate with each other via a system bus 1003. Moreover, the machine-readable storage medium stores a machine-executable instruction that can be executed by the processor, and the machine-executable instruction enables the processor to:

preprocess a two-dimensional code image to obtain a data codeword for decoding; perform optimal parameter matching, based on the data codeword, to obtain a corresponding interpolation severity; perform interpolation, based on the interpolation severity, to construct a binary polynomial; obtain an information codeword based on the binary polynomial; and perform data decoding, based on the information codeword, to obtain original information corresponding to the two-dimensional code image.

The machine-executable instruction enables the processor to: identify a dark module and a light module in the two-dimensional code image; perform format information decoding on the two-dimensional code image; determine a version of the two-dimensional code image; eliminate a mask of the two-dimensional code image; and restore a data codeword and an error correction codeword of the two-dimensional code image.

The machine-executable instruction further enables the processor to: perform information security check on the two-dimensional code image based on the restored data codeword.

The machine-executable instruction enables the processor to: determine whether the restored data codeword conforms to format information and version information, and if the restored data codeword conforms to the format information and the version information, obtain the data codeword for decoding, or if the restored data codeword does not conform to the format information and the version information, further preprocess the two-dimensional code image until a restored data codeword conforms to the format information and the version information.

The machine-executable instruction enables the processor to: set an initial variable based on an information codeword weight and an error correction codeword weight in the data codeword, and update the initial variable through fitting and iteration.

The machine-executable instruction enables the processor to: self-define an initial interpolation point of the binary polynomial, and perform interpolation at least m times at each interpolation point based on a weighted dictionary reverse order table by using an improved Kotter interpolation algorithm in combination with the interpolation severity, where m is the interpolation severity.

The machine-executable instruction enables the processor to: factorize the binary polynomial to obtain a unary polynomial set; perform screening in the unary polynomial set to obtain an optimal information polynomial; and use the optimal information polynomial as the information codeword.

The machine-executable instruction enables the processor to: recode unary polynomials in the unary polynomial set to obtain intermediate codewords; and compare the intermediate codewords with the data codeword, and select a unary polynomial corresponding to an intermediate codeword with a minimum Hamming distance as the optimal information polynomial.

The machine-readable storage medium 1002 mentioned herein may be any electronic, magnetic, optical, or other physical storage apparatuses, and may include or store information, for example, executable instructions and data. For example, the machine-readable storage medium 1002 may be a random access memory (RAM), a volatile memory, a non-volatile memory, a flash memory, a storage drive (for example, a hard disk drive), a solid state drive, any type of storage disk (for example, an optical disc or a DVD), a similar storage medium, or a combination thereof.

FIG. 6 is a schematic structural diagram of a two-dimensional code error correction decoding apparatus according to another embodiment of this disclosure. As shown in FIG. 6, as divided based on functions, the two-dimensional code error correction decoding apparatus 600 includes: a preprocessing module 610, an interpolation module 620, an information codeword generation module 630, and a decoding module 640.

The preprocessing module 610 is configured to preprocess a two-dimensional code image to obtain a data codeword for decoding. The interpolation module 620 is configured to perform optimal parameter matching, based on the data codeword, to obtain a corresponding interpolation severity, and perform interpolation, based on the interpolation severity, to construct a binary polynomial. The information codeword generation module 630 is configured to obtain an information codeword based on the binary polynomial. The decoding module 640 is configured to perform data decoding, based on the information codeword, to obtain original information corresponding to the two-dimensional code image.

Figure 7:
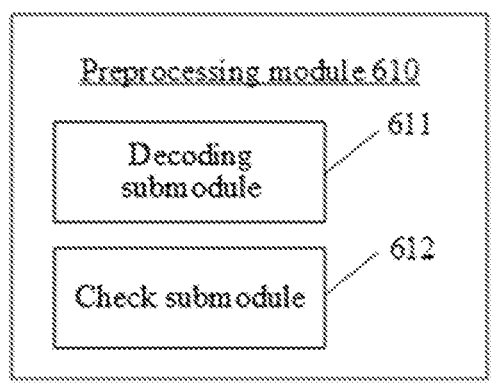
FIG. 7 is a schematic structural diagram of a preprocessing module according to another embodiment of this disclosure.

FIG. 7 is a schematic diagram of the preprocessing module according to an embodiment. As shown in FIG. 7, the preprocessing module 610 includes: a decoding submodule 611 and a check submodule 612. The decoding submodule 611 is configured to decode the two-dimensional code image, including: identifying a dark module and a light module in the two-dimensional code image; performing format information decoding on the two-dimensional code image; determining a version of the two-dimensional code image; eliminating a mask of the two-dimensional code image; and restoring a data codeword and an error correction codeword of the two-dimensional code image. The check submodule 612 is configured to perform information security check on the two-dimensional code image based on the restored data codeword, and if the check succeeds, obtain the data codeword for decoding.

A check process of the check submodule 612 includes: determining whether the restored data codeword conforms to format information and version information, and if the restored data codeword conforms to the format information and the version information, obtaining the data codeword for decoding, or if the restored data codeword does not conform to the format information and the version information, further preprocessing the two-dimensional code image until a restored data codeword conforms to the format information and the version information.

As shown in FIG. 6, the two-dimensional code error correction decoding apparatus 600 in this embodiment further includes: a fitting module 650, configured to set an initial variable based on an information codeword weight and an error correction codeword weight in the data codeword, and update the initial variable through fitting and iteration.

Figure 8:
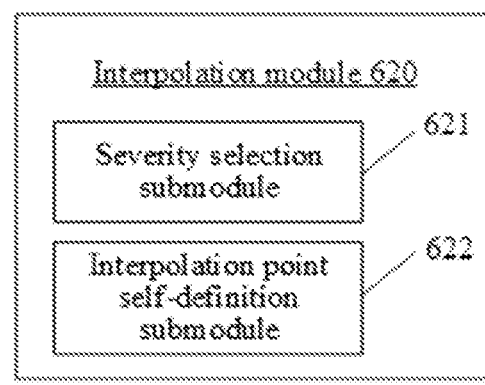
FIG. 8 is a schematic structural diagram of an interpolation module according to another embodiment of this disclosure.

FIG. 8 is a schematic diagram of the interpolation module according to an embodiment. As shown in FIG. 8, the interpolation module 620 includes: a severity selection submodule 621 and an interpolation point self-definition submodule 622. The severity selection submodule 621 is configured to perform optimal parameter matching to obtain the interpolation severity m. The interpolation point self-definition submodule 622 is configured to self-define an initial interpolation point of the binary polynomial, and perform interpolation at least m times at each interpolation point based on a weighted dictionary reverse order table by using an improved Kotter interpolation algorithm in combination with the interpolation severity.

Figure 9:
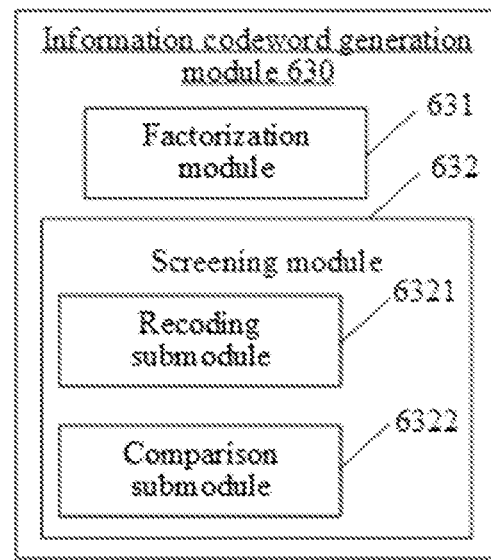
FIG. 9 is a schematic structural diagram of an information codeword generation module according to another embodiment of this disclosure.

FIG. 9 is a schematic diagram of the information codeword generation module according to an embodiment. As shown in FIG. 9, the information codeword generation module 630 includes a factorization module 631 and a screening module 632. The factorization module 631 is configured to factorize the binary polynomial to obtain a unary polynomial set. The screening module 632 is configured to perform screening in the unary polynomial set to obtain an optimal information polynomial. The screening module 632 includes: a recoding submodule 6321 and a comparison submodule 6322. The recoding submodule 6321 is configured to recode unary polynomials in the unary polynomial set to obtain intermediate codewords. The comparison submodule 6322 is configured to compare the intermediate codewords with the data codeword, and select a unary polynomial corresponding to an intermediate codeword with a minimum Hamming distance as the optimal information polynomial.

For functions of the modules in the logic, refer to related descriptions in the method embodiment. Details are not described herein again.

Based on the above, the two-dimensional code error correction decoding apparatus provided in this embodiment can achieve the same technical effect as the two-dimensional code error correction decoding method. Details are not described herein again.

It should be noted that the computer-readable medium illustrated in this application may be a computer-readable signal medium, a computer-readable medium, or any combination thereof. The computer-readable medium may be, for example but not limited to, an electronic, magnetic, optical, electromagnetic, infrared, or semiconductor system, apparatus, or device, or any combination thereof. More specific examples of the computer-readable medium may include, but are not limited to, electrical connections having one or more wires, a portable computer disk, a hard disk, a RAM, a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this application, the computer-readable medium may be any tangible medium including or storing a program, and the program can be used by an instruction execution system, apparatus, or device or used in combination with an instruction. In this application, the computer-readable signal medium may include a data signal that is propagated in a baseband or as a part of a carrier, carrying computer-readable program code. The propagated data signal may be in a variety of forms including, but not limited to, an electromagnetic signal, an optical signal, or any suitable combination thereof. Alternatively, the computer-readable signal medium may be any computer-readable medium other than the computer-readable medium, and the computer-readable medium can send, propagate, or transmit a program that is used by an instruction execution system, apparatus, or device or used in combination with an instruction. The program code included on the computer-readable medium may be transmitted by using any suitable medium, including, but not limited to, radio, an electrical wire, an optical cable, RF, and the like, or any suitable combination thereof.

The flowcharts and block diagrams in the accompanying drawings illustrate the architecture, functions, and operations of possible implementations of systems, methods, and computer program products according to the embodiments of this application. In this regard, each block in the flowcharts or the block diagrams may represent a module, a program segment, or a part of code that includes one or more executable instructions for implementing specified logical functions. It should also be noted that in some alternative implementations, functions noted in blocks may occur in a different order than that illustrated in the accompanying drawings. For example, two successively represented blocks actually may be executed substantially in parallel, or sometimes may be executed in a reverse order, which depends on the functions involved. It should also be noted that each block in the block diagrams or the flowcharts and combinations of blocks in the block diagrams or the flowcharts may be implemented by using a dedicated hardware-based system that performs specified functions or operations, or may be implemented by a combination of dedicated hardware and computer instructions.

A unit involved in the descriptions of the embodiments of this application may be implemented by software or hardware. Alternatively, the described unit may be disposed in a processor, for example, may be described as follows: a processor includes a sending unit, an obtaining unit, a determining unit, and a first processing unit. The names of these units do not constitute a limitation on the units in some cases. For example, the sending unit may also be described as "a unit that sends an image obtaining request to a server end connected thereto".

In addition, this disclosure further provides a computer-readable medium. The computer-readable medium may be included in the device described in the foregoing embodiments, or may be separately present without being assembled into the device. The computer-readable medium carries one or more programs. When the one or more programs are executed by the device, the device is enabled to:

preprocess a two-dimensional code image to obtain a data codeword for decoding; perform optimal parameter matching, based on the data codeword, to obtain a corresponding interpolation severity, and perform interpolation, based on the interpolation severity, to construct a binary polynomial; obtain an optimal information polynomial based on the binary polynomial, and use the optimal information polynomial as an information codeword; and perform data decoding, based on the information codeword, to obtain original information corresponding to the two-dimensional code image.

When the one or more programs are executed by the device, the device is enabled to:

identify a dark module and a light module in the two-dimensional code image; perform format information decoding on the two-dimensional code image; determine a version of the two-dimensional code image; eliminate a mask of the two-dimensional code image; and restore a data codeword and an error correction codeword of the two-dimensional code image.

When the one or more programs are executed by the device, the device is enabled to:

perform information security check on the two-dimensional code image based on the restored data codeword.

When the one or more programs are executed by the device, the device is enabled to:

determine whether the restored data codeword conforms to format information and version information, and if the restored data codeword conforms to the format information and the version information, obtain the data codeword for decoding, or if the restored data codeword does not conform to the format information and the version information, further preprocess the two-dimensional code image until a restored data codeword conforms to the format information and the version information.

When the one or more programs are executed by the device, the device is enabled to:

set an initial variable based on an information codeword weight and an error correction codeword weight in the data codeword, and update the initial variable through fitting and iteration.

When the one or more programs are executed by the device, the device is enabled to:

self-define an initial interpolation point of the binary polynomial, and perform interpolation at least m times at each interpolation point based on a weighted dictionary reverse order table by using an improved Kotter interpolation algorithm in combination with the interpolation severity, where m is the interpolation severity.

When the one or more programs are executed by the device, the device is enabled to:

factorize the binary polynomial to obtain a unary polynomial set; perform screening in the unary polynomial set to obtain an optimal information polynomial; and use the optimal information polynomial as the information codeword.

When the one or more programs are executed by the device, the device is enabled to:

recode unary polynomials in the unary polynomial set to obtain intermediate codewords; and compare the intermediate codewords with the data codeword, and select a unary polynomial corresponding to an intermediate codeword with a minimum Hamming distance as the optimal information polynomial.

Embodiments of the subject matter and functional operations described in the specification may be implemented in the following: a digital electronic circuit, tangibly embodied computer software or firmware, computer hardware including the structures disclosed in the specification and structural equivalents thereof, or a combination of one or more of them. The embodiments of the subject matter described in the specification may be implemented as one or more computer programs, that is, one or more modules in computer program instructions encoded on a tangible non-transitory program carrier to be executed by a data processing apparatus or to control operations of a data processing apparatus. Alternatively or additionally, the program instructions may be encoded on an artificially generated propagation signal, such as a machine-generated electrical, optical, or electromagnetic signal that is generated to encode information and transmit the information to a suitable receiver apparatus for execution by the data processing apparatus. The computer storage medium may be a machine-readable storage device, a machine-readable storage substrate, a random or serial access memory device, or a combination of one or more of them.

The processing and logical procedures described in the specification may be performed by one or more programmable computers executing one or more computer programs, to perform corresponding functions by operating based on input data and generating an output. Alternatively, the processing and logical procedures may be performed by a dedicated logical circuit, such as a field programmable gate array (FPGA) or an application-specific integrated circuit (ASIC), and the apparatus may be implemented as the dedicated logical circuit.

Computers suitable to execute a computer program include, for example, general-purpose and/or special-purpose microprocessors, or any other types of central processing units. Generally, the central processing unit receives instructions and data from a ROM and/or a RAM. Basic components of a computer include a central processing unit for implementing or executing instructions and one or more memory devices for storing instructions and data. Generally, the computer further includes one or more mass storage devices for storing data, such as a magnetic disk, a magneto-optical disk, or an optical disc, or the computer is operably coupled to the mass storage device to receive data therefrom, or transfer data thereto, or both. Certainly, the computer does not have to have such devices. Furthermore, the computer may be embedded in another device, such as a mobile phone, a personal digital assistant (PDA), a mobile audio or video player, a game console, a global positioning system (GPS) receiver, or, for example, a portable storage device with a universal serial bus (USB) flash drive, to name a few.

Computer readable media suitable to store computer program instructions and data include all forms of non-volatile memories, media, and storage devices including, for example, a semiconductor memory device (for example, an EPROM, an EEPROM, and a flash memory device), a magnetic disk (for example, an internal hard disk or a removable disk), a magneto-optical disk, and CD ROM and DVD-ROM discs. The processor and the memory may be supplemented by or incorporated in a special-purpose logical circuit.

Although the specification contains many specific implementation details, these are not to be construed as limiting the scope of any invention or the scope of the claimed protection, but mainly used to describe features of a specific embodiment of a particular invention. Some features described in various embodiments in the specification may also be implemented in combination in a single embodiment. In addition, various features described in a single embodiment may also be implemented separately in various embodiments or implemented in any suitable sub-combination. Furthermore, although features may function in some combinations as described above and even initially claimed, one or more features from a claimed combination may be removed from the combination in some cases, and the claimed combination may be directed to a sub-combination or a variation of the sub-combination.

Similarly, although operations are depicted in a particular order in the accompanying drawings, this should not be construed as requiring that the operations be performed in the particular order shown or performed sequentially, or all illustrated operations be performed, to achieve an expected result. In some cases, multitasking and parallel processing may be advantageous. Furthermore, separation of various system modules and components in the foregoing embodiments should not be construed as that such separation is needed in all embodiments, and it should be understood that the described program components and systems generally may be integrated in a single software product, or packaged into a plurality of software products.

Thus, specific embodiments of the subject matter have been described. Other embodiments are within the scope of the appended claims. In some cases, the actions recited in the claims may be performed in a different order but still achieve an expected result. Furthermore, the processing depicted in the accompanying drawings is not necessarily performed in the specific order or sequentially as shown to achieve the expected result. In some implementations, multitasking and parallel processing may be advantageous.

It should be further noted that, the relational terms herein such as first and second are merely used to distinguish one entity or operation from another entity or operation, but do not require or imply such an actual relationship or sequence between the entities or operations. The terms "include", "comprise", or any other variant thereof is intended to cover a non-exclusive inclusion, so that a process, a method, an article, or a device that includes a list of elements not only includes those elements but also includes other elements which are not expressly listed, or further includes elements inherent to such process, method, article, or device. If no more limitations are made, an element limited by "include a/an . . . " does not exclude other same elements existing in the process, the method, the article, or the device including the element.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

The method and apparatus provided in the embodiments of the present invention are described above in detail. The principle and implementations of the present invention are described in the specification by using specific examples. The description about the embodiments of the present invention is merely provided to help understand the method and core ideas of the present invention. In addition, a person of ordinary skill in the art can make variations to the present invention in terms of the specific implementations and application scopes according to the ideas of the present invention. Therefore, the content of the specification shall not be construed as a limitation to the present invention.

What is claimed is:

1. A two-dimensional code error correction decoding method, comprising:
preprocessing a two-dimensional code image to obtain a data codeword for decoding;
performing optimal parameter matching, based on the data codeword, to obtain an interpolation severity corresponding to the performing optimal parameter matching;
performing interpolation, based on the interpolation severity, to construct a binary polynomial;
determining an information codeword based on the binary polynomial; and
performing data decoding, based on the information codeword, to obtain original information corresponding to the two-dimensional code image,
wherein the performing optimal parameter matching based on the data codeword comprises:

setting an initial variable based on an information codeword weight and an error correction codeword weight in the data codeword, and updating the initial variable through fitting and iteration.

2. The method according to claim 1, wherein the preprocessing the two-dimensional code image comprises:

identifying a dark module and a light module in the two-dimensional code image;

performing format information decoding on the two-dimensional code image;

determining a version of the two-dimensional code image;

eliminating a mask of the two-dimensional code image; and restoring a data codeword and an error correction codeword of the two-dimensional code image.

3. The method according to claim 2, wherein the method further comprises:

performing information security check on the two-dimensional code image based on the restored data codeword.

4. The method according to claim 3, wherein the performing information security check comprises:

determining whether the restored data codeword conforms to format information and version information, and if the restored data codeword conforms to the format information and the version information, obtaining the data codeword for decoding, or if the restored data codeword does not conform to the format information and the version information, further preprocessing the two-dimensional code image until a restored data codeword conforms to the format information and the version information.

5. The method according to claim 1, wherein the performing interpolation based on the interpolation severity comprises:

self-defining an initial interpolation point of the binary polynomial, and performing interpolation at least m times at each interpolation point based on a weighted dictionary reverse order table by using an improved Kotter interpolation algorithm in combination with the interpolation severity, wherein m is a number of the interpolation performed.

6. The method according to claim 1, wherein the determining the information codeword based on the binary polynomial comprises:

factorizing the binary polynomial to obtain a unary polynomial set;

performing screening in the unary polynomial set to obtain an optimal information polynomial; and using the optimal information polynomial as the information codeword.

7. The method according to claim 6, wherein the performing screening in the unary polynomial set to obtain the optimal information polynomial comprises:

recoding unary polynomials in the unary polynomial set to obtain intermediate codewords; and comparing the intermediate codewords with the data codeword, and selecting a unary polynomial corresponding to an intermediate codeword with a minimum Hamming distance as the optimal information polynomial.

8. An electronic device, comprising:

a processor; and a machine-readable storage medium, wherein the machine-readable storage medium stores machine-executable instruction that can be executed by the processor, and the machine-executable instruction enables the processor to:

preprocess a two-dimensional code image to obtain a data codeword for decoding;

perform optimal parameter matching, based on the data codeword, to obtain a corresponding interpolation severity;

perform interpolation, based on the interpolation severity, to construct a binary polynomial;

obtain an information codeword based on the binary polynomial; and perform data decoding, based on the information codeword, to obtain original information corresponding to the two-dimensional code image, wherein the machine-executable instruction enables the processor to:

set an initial variable based on an information codeword weight and an error correction codeword weight in the data codeword, and update the initial variable through fitting and iteration.

9. The electronic device according to claim 8, wherein the machine-executable instruction enables the processor to:

identify a dark module and a light module in the two-dimensional code image;

perform format information decoding on the two-dimensional code image;

determine a version of the two-dimensional code image;

eliminate a mask of the two-dimensional code image; and restore a data codeword and an error correction codeword of the two-dimensional code image.

10. The electronic device according to claim 9, wherein the machine-executable instruction further enables the processor to:

perform information security check on the two-dimensional code image based on the restored data codeword.

11. The electronic device according to claim 10, wherein the machine-executable instruction enables the processor to:

determine whether the restored data codeword conforms to format information and version information, and if the restored data codeword conforms to the format information and the version information, obtain the data codeword for decoding, or if the restored data codeword does not conform to the format information and the version information, further preprocess the two-dimensional code image until a restored data codeword conforms to the format information and the version information.

12. The electronic device according to claim 8, wherein the machine-executable instruction enables the processor to:

self-define an initial interpolation point of the binary polynomial, and perform interpolation at least m times at each interpolation point based on a weighted dictionary reverse order table by using an improved Kotter interpolation algorithm in combination with the interpolation severity, wherein m is a number of the interpolation performed.

13. The electronic device according to claim 8, wherein the machine-executable instruction enables the processor to:

factorize the binary polynomial to obtain a unary polynomial set;

perform screening in the unary polynomial set to obtain an optimal information polynomial; and use the optimal information polynomial as the information codeword.

14. The electronic device according to claim 13, wherein the machine-executable instruction enables the processor to:

recode unary polynomials in the unary polynomial set to obtain intermediate codewords; and compare the intermediate codewords with the data codeword, and select a unary polynomial corresponding to an intermediate codeword with a minimum Hamming distance as the optimal information polynomial.

15. A computer-implemented method of two-dimensional code error correction decoding for restoring original information encoded in a two-dimensional code image, the method comprising:

reading the two-dimensional code image by a two-dimensional code identification means in an application in a client;

preprocessing the two-dimensional code image to obtain a data codeword for decoding;

performing optimal parameter matching to obtain an interpolation severity based on the data codeword;

performing interpolation to construct a binary polynomial based on the interpolation severity, wherein an initial interpolation point of a binary polynomial is self-defined, and performing interpolation at least m times at each interpolation point based on a weighted dictionary reverse order table by using an improved Kotter interpolation algorithm in combination with the interpolation severity, wherein m is a number of the interpolation performed;

determining an information codeword based on the binary polynomial; and performing data decoding to obtain the original information encoded in the two-dimensional code image based on the information codeword, wherein the performing optimal parameter matching based on the data codeword comprises:

setting an initial variable based on an information codeword weight and an error correction codeword weight in the data codeword, and updating the initial variable through fitting and iteration.

16. The computer-implemented method according to claim 15, wherein the preprocessing the two-dimensional code image comprises:

identifying a dark module and a light module in the two-dimensional code image;

performing format information decoding on the two-dimensional code image;

determining a version of the two-dimensional code image;

eliminating a mask of the two-dimensional code image; and restoring a data codeword and an error correction codeword of the two-dimensional code image; and performing information security check on the two-dimensional code image based on the restored data codeword.

17. The computer-implemented method according to claim 15, wherein the two-dimensional code image is a quick response code (QR code).

* * * * *